US008891658B2

(12) United States Patent
Liu (10) Patent No.: US 8,891,658 B2
(45) Date of Patent: Nov. 18, 2014

(54) METHOD OF TRANSMITTING FEEDBACK INFORMATION IN A MIMO COMMUNICATION SYSTEM AND DEVICE THEREOF

(75) Inventor: Hao Liu, PuDong Jinqiao Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/814,811

(22) PCT Filed: Jul. 27, 2011

(86) PCT No.: PCT/IB2011/002065
§ 371 (c)(1),
(2), (4) Date: Feb. 7, 2013

(87) PCT Pub. No.: WO2012/020310
PCT Pub. Date: Feb. 16, 2012

(65) Prior Publication Data
US 2013/0136200 A1    May 30, 2013

(30) Foreign Application Priority Data
Aug. 9, 2010    (CN) .......................... 2010 1 0248713

(51) Int. Cl.
*H04B 7/02*    (2006.01)
*H04B 7/04*    (2006.01)
*H04B 7/06*    (2006.01)
(52) U.S. Cl.
CPC .............. *H04B 7/0478* (2013.01); *H04B 7/065* (2013.01); *H04B 7/0417* (2013.01); *H04B 7/0641* (2013.01)
USPC ........... 375/267; 375/260; 375/299; 375/347; 375/349

(58) Field of Classification Search
USPC .......................... 375/267, 260, 299, 347, 349
See application file for complete search history.

(56) References Cited

U.S. PATENT DOCUMENTS

| 2004/0127257 A1 | 7/2004 | Raghothaman et al. |
| 2007/0207730 A1 | 9/2007 | Nguyen et al. |
| 2013/0016764 A1* | 1/2013 | Kim et al. ..................... 375/219 |

FOREIGN PATENT DOCUMENTS

EP    2 273 691 A1    1/2011

OTHER PUBLICATIONS

International Search Report for PCT/IB2011/002065 dated Feb. 7, 2012.

* cited by examiner

*Primary Examiner* — Kabir A Timory
(74) *Attorney, Agent, or Firm* — Fay Sharpe LLP (57) ABSTRACT

The present invention provides a method of providing feedback information in a user equipment of a communication system based on MIMO, comprising: determining a first latest measured long-term covariance matrix according to a downlink channel matrix model; transmitting the quantization of a first latest estimated long-term covariance matrix corresponding to the first latest measured long-term covariance matrix to the base station; determining a second latest measured long-term covariance matrix according to a downlink channel matrix model; determining the variation information of a second latest estimated long-term covariance matrix with respect to an estimated long-term covariance matrix of the last-time reset point; and transmitting the quantization of the variation information to the base station. With such a solution, overhead during the feedback of long-term covariance matrix is greatly reduced in MIMO scenario.

14 Claims, 4 Drawing Sheets

METHOD OF TRANSMITTING FEEDBACK INFORMATION IN A MIMO COMMUNICATION SYSTEM AND DEVICE THEREOF

TECHNICAL FIELD

The present invention pertains to a wireless communication network, particular to a method of transmitting feedback information in a MIMO communication system and a device thereof.

BACKGROUND

CoMP(Coordinated Multi-Point) transmission is an effective way to reduce ICI (Inter-cell interference), improve data efficiency, enhance cell-edge throughput and/or improve overall system throughput in the LTE-A(Long Term Evolution-Advanced).

Multi-antenna technology, for example MU-MIMO (multi-user MIMO) for a single cell and CoMP transmission are introduced into LTE-A to meet the requirement of enhanced version IMT. Moreover, MU-MIMO technology for a single cell can stand competition due to its signaling simplicity, convenient deployment and good system performance. Certainly, channel information feedback is of an important factor in the MU-MIMO transmission scheme. It has not been well settled in the MU-MIMO scheme about how to improve channel feedback precision and decrease feedback overhead as far as possible.

SUMMARY OF THE INVENTION

In light of the deficiency in the background, the present invention provides a method and device of transmitting feedback information in a MIMO communication system, thereby improving accuracy of feedback of channel information with overhead of feedback of channel information reduced.

In a communication system, the precoding for a subband involves two codebook matrices, one of which targets wideband and/or long-term channel properties, and the other of which targets frequency-selective and/or short-term channel properties. Based on the feedback framework, long-term wideband covariance matrix is used to aid channel feedback enhancement. With transformation of long-term covariance matrix, the adaptive codebook is rotated and aligned to the preferred beamforming direction, which is the dominant eigenvector of long-term covariance matrix. During the course of quantization of the measurement of relevant channel, the adaptive codebook can be selected from only a spherical cap pointing to the dominant eigenvector rather than the whole hypersphere, therefore channel feedback precision will be greatly improved.

Covariance matrix is composed of different levels of eigenvector. Long-term wideband eigenvectors fluctuate rather slowly in time zone, namely, some time correlation exists therein, and then the time correlation or channel variation information can be exploited in the solution of the present invention to aid channel feedback and reduce feedback overhead for long-term covariance matrix.

Based on the above aspects, according to one embodiment of the present invention, there is provided a method of providing feedback information to a base station in a user equipment of a communication system based on MIMO, comprising: determining a first latest measured long-term covariance matrix according to a downlink channel matrix model; transmitting the quantization of a first latest estimated long-term covariance matrix corresponding to the first latest measured long-term covariance matrix to the base station; determining a second latest measured long-term covariance matrix according to a downlink channel matrix model; determining variation information of a second latest estimated long-term covariance matrix with respect to an estimated long-term covariance matrix of the last-time reset point; wherein, the second latest estimated long-term covariance matrix derived according to the variation information and the estimated long-term covariance matrix of the last-time reset point most approximates the second latest measured long-term covariance matrix; and transmitting the quantization of the variation information to the base station.

According to another embodiment of the present invention, there is provided a method of processing feedback information from a user equipment in a base station of a communication system based on MIMO, comprising: receiving the feedback information from the user equipment; determining a latest estimated long-term covariance matrix according to the feedback information.

In another embodiment of the present invention, when the feedback information comprises the index information of a codeword to which variation information corresponds in a variation information codebook, the above step of determining a latest estimated long-term covariance matrix further comprises: determining a corresponding codeword in the variation information codebook according to the index information; and determining the latest estimated long-term covariance matrix according to the codeword to which the index information corresponds and an estimated long-term covariance matrix of the last-time reset point, wherein the variation information is used for reflecting the variation of the latest estimated long-term covariance matrix with respect to the estimated long-term covariance matrix of the last-time reset point.

In still another embodiment of the present invention, when the feedback information comprises the index information of a codeword to which the latest estimated long-term covariance matrix corresponds in a long-term covariance matrix codebook, the above step of determining a latest estimated long-term covariance matrix further comprises: determining the latest estimated long-term covariance matrix from the long-term covariance matrix codebook according to the index information.

According to yet another embodiment of the present invention, there is provided a device for providing feedback information to a base station in a user equipment of a communication system based on MIMO, comprising: a first determining unit of latest measured long-term covariance matrix, configured to determine a first latest measured long-term covariance matrix according to a downlink channel matrix; a first transmitting unit of latest measured long-term covariance matrix, configured to transmit the quantization of a first latest estimated long-term covariance matrix corresponding to the first latest measured long-term covariance matrix to the base station; a second determining unit of latest measured long-term covariance matrix, configured to determine a second latest measured long-term covariance matrix according to a downlink channel matrix model; a variation information determining unit, configured to determine variation information of a second latest estimated long-term covariance matrix with respect to an estimated long-term covariance matrix of the last-time reset point; wherein, the second latest estimated long-term covariance matrix derived according to the variation information and the estimated long-term covariance matrix of the last-time reset point most approximates the second latest measured long-term covariance matrix; and a variation information transmitting unit, configured to transmit the quantization of the variation information to the base station.

In another embodiment of the present invention, the quantization of the variation information in the variation information transmitting unit is the index information of a codeword to which the variation information corresponds in a variation information codebook, and the quantization of the first latest estimated long-term covariance matrix in the first transmitting unit of latest measured long-term covariance matrix may be the index of a codeword to which the first latest estimated long-term covariance matrix corresponds in a long-term covariance matrix codebook, and the variation information determining unit configured to determine the variation information according to the following formula, $$W = \arg\max \frac{|\text{trace}(\overline{R}(t+nT)\hat{\overline{R}}(t+nT)^H)|}{\|\overline{R}(t+nT)\|_F \|\hat{\overline{R}}(t+nT)\|_F},$$

$$\hat{\overline{R}}(t+nT) = W\hat{\overline{R}}(t)W^H$$

wherein, W denotes the codeword satisfying the above formula in the variation information codebook, $W^H$ denotes the conjugate transpose matrix of the codeword W, instant t denotes the last-time reset point, T denotes the period of a long-term feedback, instant t+nT denotes occurrence point of the second latest measurement, W denotes the variation information of the estimated long-term covariance matrix $\overline{R}$(t+nT) in instant t+nT with respect to the estimated long-term covariance matrix $\overline{R}$(t) in instant t, $\|(\cdot)\|_F$ denotes operation of normalization.

According to another embodiment of the present invention, there is provided a device for processing feedback information from a user equipment in a base station of a communication system based on MIMO, comprising: a feedback information receiving unit, configured to receive the feedback information from the user equipment; a determining unit of latest estimated long-term covariance matrix, configured to determine latest estimated long-term covariance matrix according to the feedback information.

In another embodiment of the present invention, when the feedback information comprises the index information of a codeword to which variation information corresponds in a variation information codebook, the determining unit of latest estimated long-term covariance matrix is further configured to determine a corresponding codeword in the variation information codebook according to the index information; and to determine the latest estimated long-term covariance matrix according to the codeword to which the index information corresponds and an estimated long-term covariance matrix of the last-time reset point; wherein, the variation information is used for reflecting the variation of the latest estimated long-term covariance matrix with respect to the estimated long-term covariance matrix of the last-time reset point; and when the feedback information comprises the index information of a codeword to which the latest estimated long-term covariance matrix corresponds in a long-term covariance matrix codebook, the determining unit of latest estimated long-term covariance matrix is further configured to determining the latest estimated long-term covariance matrix from the long-term covariance matrix codebook according to the index information.

In the embodiment(s) of the present invention, to determine and transmit the variation information of the latest estimated long-term covariance matrix with respect to the estimated long-term covariance matrix of the last-time reset point; wherein, the latest estimated long-term covariance matrix derived according to the variation information and the estimated long-term covariance matrix of the last-time reset point most approximates the latest measured long-term covariance matrix. With the above steps, channel feedback information is transmitted and processed via channel by above variation information, thereby transmission overhead being greatly reduced as compared with direct transmission/processing of an integral estimated long-term covariance matrix.

In another embodiment of the present invention, for time-domain of the course of feedback transmission, the quantization of the latest estimated long-term covariance matrix is fed back every multiple long-term feedback duration, namely, to conduct a feedback for the information of the latest estimated long-term covariance matrix in its entirety. By repeating the above steps periodically, reference that the above variation information is based on may be reset, namely an estimated long-term covariance matrix for a new reset point is generated at interval of a certain duration, that is, multiple long-term feedback durations, which guarantees precision of feedback information.

BRIEF DESCRIPTION OF THE DRAWINGS

Features, aspects and advantages of the present invention will become obvious by reading the following description of non-limiting embodiments with the aid of appended drawings.

wherein, same or similar reference numerals refer to the same or similar steps or means.

DETAILED DESCRIPTION OF EMBODIMENTS

Without loss of generality, some embodiments of the present invention are applicable to LTE-A or LTE communication network under multi-user MIMO scenario, those skilled in the art nonetheless should appreciate that the present invention may still be applicable to the network of other types, for instance the LTE network under single-user MIMO scenario.

Detailed description will be made hereinafter for those nonrestrictive embodiments of the present invention in combination with the accompanying figures.

Figure 1:
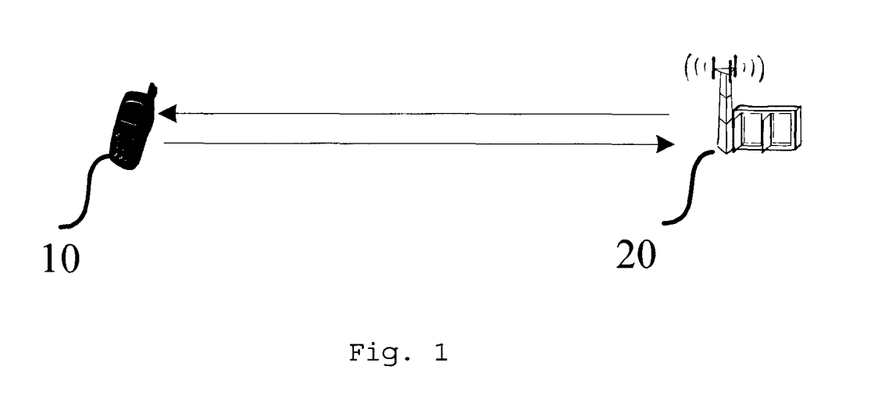
FIG. 1 illustrates a topology between a user equipment and a base station according to one embodiment of the present invention.

FIG. 1 illustrates a topology between user equipment and base station according to one embodiment of the present invention. As shown in the figure, the system comprises a user equipment (UE) 10, and a base station 20, wherein it is assumed that base station 20 is configured with 4 transmitting antennas, and UE 10 is configured with 2 receiving antenna.

Figure 2:
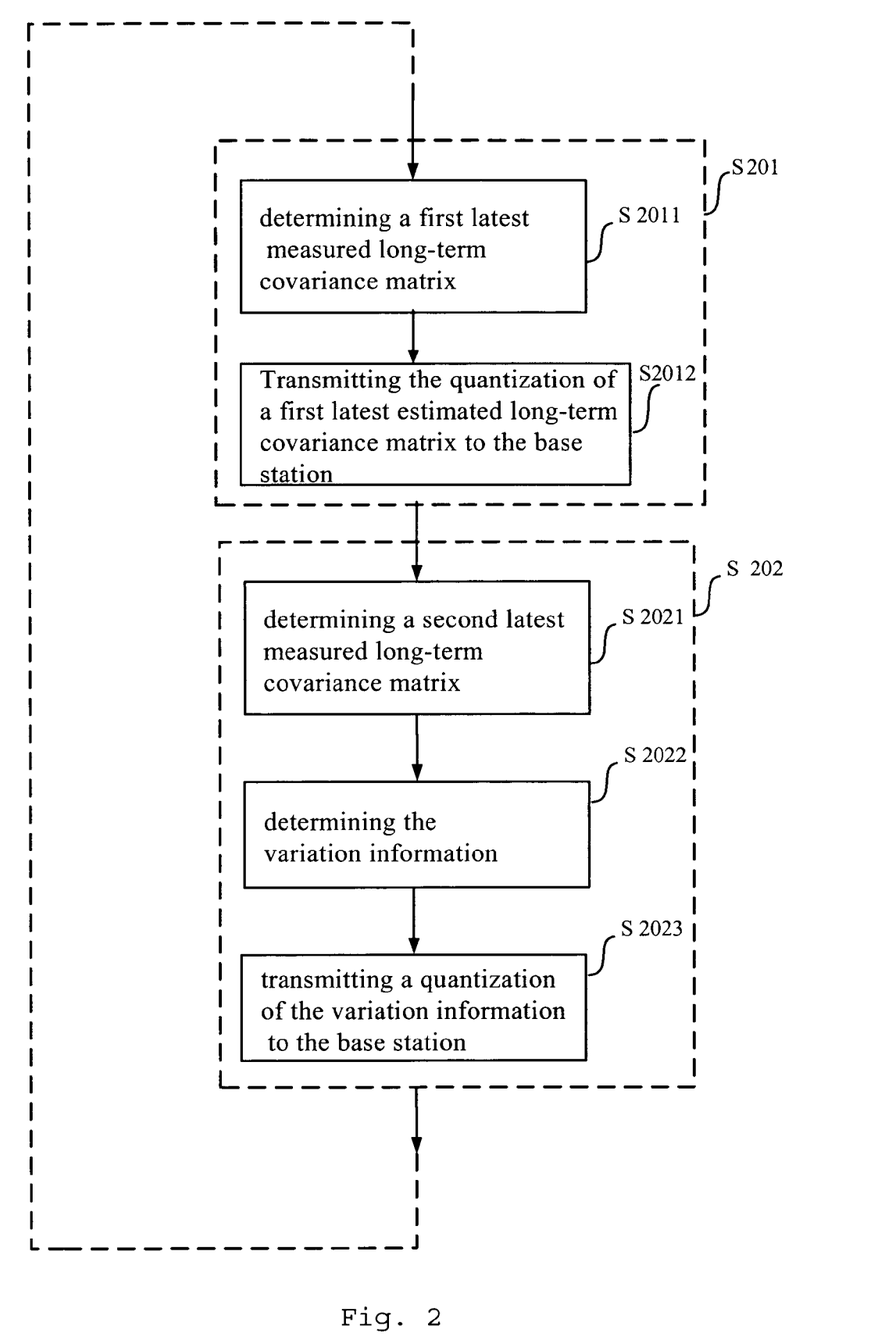
FIG. 2 illustrates the flowchart of a method of providing feedback information to a base station in a user equipment according to one embodiment of the present invention.

FIG. 2 illustrates the flowchart of a method of providing feedback information to a base station in a UE according to one embodiment of the present invention. The method for providing a base station with feedback information includes step S201 of determining and transmitting a first latest measured long-term covariance matrix, and step S202 of determining and transmitting variation information.

In a substep S2011 of step S201, UE 10 determines a first latest measured long-term covariance matrix according to a downlink channel matrix model.

Subsequently, in step S2012, UE 10 transmits the quantization of a first latest estimated long-term covariance matrix corresponding to the first latest measured long-term covariance matrix to the base station 20.

In substep S2021 of step S202, UE 10 determines a second latest measured long-term covariance matrix according to a downlink channel matrix model.

Then, in step S2022, UE 10 determines variation information of a second latest estimated long-term covariance matrix with respect to an estimated long-term covariance matrix of the last-time reset point; wherein, the second latest estimated long-term covariance matrix derived according to the variation information and the estimated long-term covariance matrix of the last-time reset point most approximates the second latest measured long-term covariance matrix.

Then, in step S2023, UE 10 transmits the quantization of the variation information to the base station 20.

Figure 3:
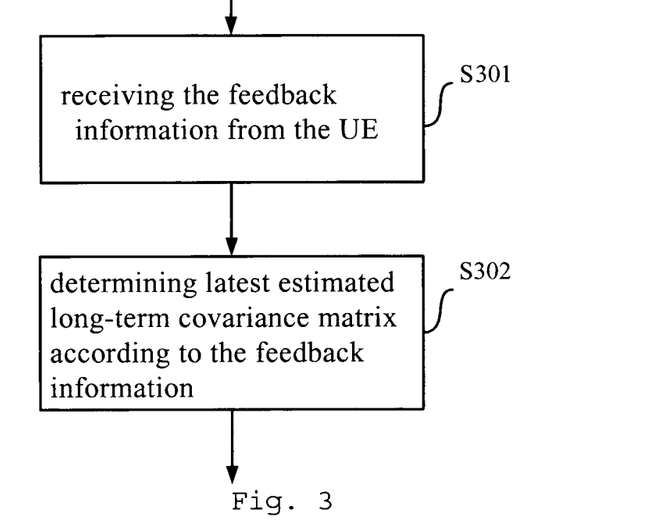
FIG. 3 illustrates the flowchart of a method of processing feedback information from a user equipment in a base station according to another embodiment of the present invention.

FIG. 3 illustrates the flowchart of a method of processing feedback information from a UE in a base station according to another embodiment of the present invention. The method for processing the feedback information from UE comprises a step S301 of receiving feedback information and a step S302 of determining a latest estimated long-term covariance matrix.

In step S301, base station 20 receives feedback information from UE 10.

In step S302, base station 20 determines a latest estimated long-term covariance matrix according to the feedback information.

In conjunction with FIG. 1, FIG. 2 and FIG. 3, exemplary description will be made in detail for such embodiment.

In such embodiment, every UE detects downlink channel according to DL reference signal from its serving cell, for instance, UE 10 shown in FIG. 1, based on downlink subframe t and subcarrier f, acquires downlink channel matrix H(t,f), meanwhile, in step S2011, according to downlink channel matrix model H(t,f), UE 10 may determine a first latest measured long-term covariance matrix by the following formula (1):

$$\overline{R}(t) = (1-\alpha)\overline{R}(t-1) + \alpha \frac{1}{|S|}\sum_{f \in S} H(t,f)^H H(t,f) \quad (1)$$

Wherein S denotes the set of subcarriers in the whole bands of the channel, |S| denotes the cardinality of S, f denotes a subcarrier in the S, t denotes the instant corresponding to a subframe in time domain, and the instant t is set to be a reset point in such embodiment, namely at this instant, UE 10 determines the latest measured long-term covariance matrix $\overline{R}(t)$ and transmits the quantization $\overline{\overline{R}}(t)$ of the latest measured long-term covariance matrix $\overline{R}(t)$ to UE 10, T denotes feedback duration of long-term covariance matrix. H(t,f) denotes downlink channel matrix model based on instant t and f, H(t,f)$^H$ denotes the conjugate transpose of the H(t,f), α denotes an averaging factor. Since description is made with an example of an antenna deployment of 4×2 Tx/Rx in the embodiment of the present invention, then the dimension of downlink channel matrix H(t,f) is 2×4, and the dimension of the measured long-term wideband covariance matrix $\overline{R}(t)$ is 4×4.

Subsequently, in step S2012, UE 10 transmits the quantization of the first latest estimated long-term covariance matrix to which the latest measured long-term covariance matrix corresponds to base station 20.

Subsequently, in step S301, base station 20 receives the feedback information from UE. The feedback information is mainly for channel description, including the long-term covariance matrix information and short-term channel information from UE 10, and generally, both of them jointly depict the relevant channel information.

Furthermore, those skilled in the art may appreciate, the long-term covariance matrix herein, according to different application scenario, may be long-term wideband covariance matrix, or long-term narrowband covariance matrix.

Herein, according to eigenvalue decomposition of matrix, long-term wideband covariance matrix can be expressed as following decomposition form shown in formula (2):

$$\overline{R}(t) = \overline{\lambda}_1(t)\overline{V}_1(t)\overline{V}_1(t)^H + \overline{\lambda}_2(t)\overline{V}_2(t)\overline{V}_2(t)^H \quad (2)$$

Where $\overline{\lambda}_{11}(t), \overline{\lambda}_{12}(t)$ are two eigenvalues of long-term covariance matrix $\overline{R}_1(t)$ in the instant t for UE 10, and $\overline{V}_{11}(t), \overline{V}_{12}(t)$ are two eigenvectors of long-term covariance matrix $\overline{R}_1(t)$.

Supposed that T is feedback duration of long-term covariance matrix, due to time correlation, difference information of long-term eigenvector can be estimated according to two sequential long-term covariance matrices. Therefore, in the next feedback instant t+T, and the subsequent feedback instant t+nT of long-term covariance matrix, there is not necessary to feed back the complete covariance matrix information.

For instance, on feedback instant t+T, allowing W to denote the variation information between two long-term eigenvectors consecutive in time domain for UE 10, then the estimated long-term eigenvector may be derived through following formula (3):

$$\overline{V}_1(t+T) = W\overline{V}_1(t)$$

$$\overline{V}_2(t+T) = W\overline{V}_2(t) \quad (3)$$

According to the eigenvalue decomposition in the above formula, the long-term covariance matrix on feedback instant t+T may be estimated by the following formula (4):

$$\hat{R}(t+T) = \overline{\lambda}_1(t)\hat{V}_1(t+T)\hat{V}_1(t+T)^H + \overline{\lambda}_2(t)\hat{V}_2(t+T)\hat{V}_2(t+T)^H \quad (4)$$
$$= \overline{\lambda}_1(t)W\hat{V}_1(t)\hat{V}_1(t)^H W^H + \overline{\lambda}_2(t)W\hat{V}_2(t)\hat{V}_2(t)^H W^H$$
$$= W\hat{R}(t)W^H$$

The dimension of the measured long-term covariance matrix $\overline{R}_1(t)$ is 4×4, therefore, preferably, an optimal codeword may be selected from a predefined 4×4 variation information codebook set $W^{4\times 4}$ as the relevant variation information W. According to collinearity rule, fluctuation information W is determined from the above variation information codebook by comparing the estimated covariance matrix $\overline{R}_1(t+T)$ and the measured covariance matrix $\overline{R}_1(t+T)$ in feedback instant t+T.

The codeword of the variation information codebook therein may be but not limited to, for instance:

$$W_1 = \text{diag}\left\{1, e^{j\frac{\pi}{64}}, e^{j\frac{2\pi}{64}}, e^{j\frac{3\pi}{64}}\right\},\quad (5)$$

$$W_2 = \text{diag}\left\{1, e^{-j\frac{\pi}{64}}, e^{-j\frac{2\pi}{64}}, e^{-j\frac{3\pi}{64}}\right\},$$

$$W_3 = \text{diag}\left\{1, e^{j\frac{3\pi}{64}}, e^{j\frac{6\pi}{64}}, e^{j\frac{9\pi}{64}}\right\},$$

$$W_4 = \text{diag}\left\{1, e^{-j\frac{3\pi}{64}}, e^{-j\frac{6\pi}{64}}, e^{-j\frac{9\pi}{64}}\right\},$$

$$W_5 = \text{diag}\left\{1, e^{j\frac{5\pi}{64}}, e^{j\frac{10\pi}{64}}, e^{j\frac{15\pi}{64}}\right\},$$

$$W_6 = \text{diag}\left\{1, e^{-j\frac{5\pi}{64}}, e^{-j\frac{10\pi}{64}}, e^{-j\frac{15\pi}{64}}\right\},$$

$$W_7 = \text{diag}\left\{1, e^{j\frac{7\pi}{64}}, e^{j\frac{14\pi}{64}}, e^{j\frac{21\pi}{64}}\right\},$$

$$W_8 = \text{diag}\left\{1, e^{-j\frac{7\pi}{64}}, e^{-j\frac{14\pi}{64}}, e^{-j\frac{21\pi}{64}}\right\}.$$

Certainly, it should be appreciated that, some other codebook(s) reflective of the variation of estimated long-term covariance matrix for different instant in the prior art may be adopted herein, and the specific form of the adopted codebook does not lead to a limitation for the present invention.

Likewise, it may be as the above case that, feedback instant t+nT is denoted in combination of variation information $W_n$ with the estimated long-term covariance matrix $\overline{R}(t)$ on t instant as a reference, for instance $\overline{R}(t+nT)=W_n\overline{R}(t)W_n^H$, no redundant description herein.

Herein, those skilled in the art may appreciate, the above variation information W may be acquired not only by using the quantized covariance matrix on reset point t as the reference, but also with the second latest estimated long-term covariance matrix $\overline{R}(t+nT)$ relative to the estimated covariance matrix of any instant among feedback instant of previous one or more time, for instance t+T, ..., t+(n-1)T.

Based thereon, in step S2021, according to downlink channel matrix model, UE 10 may determine a second latest measured long-term covariance matrix by the following formula (1'), $$\overline{R}(t+nT) = (1-\alpha)\overline{R}(t+nT-1) + \alpha\frac{1}{|S|}\sum_{f\in S}H(t+nT,f)^H H(t+nT,f) \quad (1')$$

wherein n is a positive integer, and for instance may be 1 in this embodiment, then at this time, the second latest measured long-term covariance matrix denotes the measured long-term covariance matrix $\overline{R}(t+T)$ of the first feedback instant after reset point t, namely:

$$\overline{R}(t+T) = (1-\alpha)\overline{R}(t+T-1) + \alpha\frac{1}{|S|}\sum_{f\in S}H(t+T,f)^H H(t+T,f)$$

In step S2022, UE 10 determines the variation information W of second latest estimated long-term covariance matrix $\overline{R}(t+T)$ with respect to the estimated long-term covariance matrix $\overline{R}(t)$ of last-time reset point; wherein the second latest estimated long-term covariance matrix $\overline{R}(t+T)$ is acquired by formula (4) according to the variation information W and the estimated long-term covariance matrix $\overline{R}(t)$ of last-time reset point.

Therein, the acquired second latest estimated long-term covariance matrix $\overline{R}(t+T)$ most approximates the second latest measured long-term covariance matrix $\overline{R}(t+T)$.

Subsequently, in step S2023, UE 10 transmits the quantization of the variation information to base station.

Optionally, in step S2022, the variation information may be determined according to the following formula, $$W = \arg\max\frac{\left|\text{trace}(\overline{R}(t+nT)\hat{\overline{R}}(t+nT)^H)\right|}{\|\overline{R}(t+nT)\|_F\|\hat{\overline{R}}(t+nT)\|_F}, \quad (6)$$

$$\hat{\overline{R}}(t+nT)=W\overline{R}(t)W^H \quad (7)$$

wherein W denotes the codeword satisfying the above formula (6), (7) in variation information codebook, for instance the codebook shown in formula (5), $W^H$ denotes the conjugate transpose matrix of codeword W, t denotes the last-time reset point, T denotes a long-term feedback duration, t+nT denotes the occurrence point of the second latest measurement, n may be set to be 1 in step S2022 of this embodiment, and n may be 2 after undergoing another long-term feedback duration T, and so forth, with no redundant depiction necessary hereinafter. W denotes the variation information of the estimated long-term covariance matrix $\overline{R}(t+nT)$ on t+nT instant with respect to the estimated long-term covariance matrix $\overline{R}(t)$ on t instant, $\|(\bullet)\|_F$ denotes operation of normalization.

Assuming that the instant corresponding to this feedback is t+T, namely n=1, accordingly, the estimated covariance matrix $\overline{R}_1(t+T)$ transforms the baseline codebook into an adaptive codebook on instant t+T pointing to dominant eigenvector direction of UE 10, that is normalize($\overline{R}_1(t+T)c_j$), wherein $c_j \in \{c_1, \ldots, c_S\}^{4\times 1}$ is a predetermined 4×1 codebook vector with size $S=2^B$, and normalize($\bullet$) is the operation of normalization, with $\overline{R}_1(t+T)c_j$ depicting the channel information corresponding to UE 10.

The adaptive codebook is further used for enhancement of channel feedback precision and improvement of system performance of MU-MIMO. It is unnecessary to feed back the long-term covariance matrix on every feedback instant. In a much longer feedback duration, namely the reset duration D (D>>T) in this embodiment, complete covariance matrix only requires to be reported at the starting point of the reset duration D, and then in the later sequential feedback instants t+nT, only the variation information of the channel information W needs to be fed back to depict channel quantization information. The variation information has very lower quantization bits, but still has high channel quantization precision. In the next long-term feedback duration T, the above feedback procedure may be repeated again.

Preferably, the quantization of the variation information W in step S2023 may be the index information of the codeword to which the variation information W corresponds in the variation information codebook. In this embodiment, for instance, the codeword in the codebook as shown in formula 5 may be introduced into formula (6), (7) sequentially, and the codeword $$W_2 = \text{diag}\left\{1, e^{-j\frac{\pi}{64}}, e^{-j\frac{2\pi}{64}}, e^{-j\frac{3\pi}{64}}\right\}$$

is selected as satisfying the criteria shown in formula (6), then, the index information of the codeword within the codebook may be determined to be 2. With the capacity of codebook taken into account, variation information with only 3 bits may represent the quantization of the long-term covariance matrix, namely 001 in binary mode.

Likewise, the quantization of the first latest estimated long-term covariance matrix $\widetilde{R}(t)$ in step S202 may be the index of the codeword to which the first latest estimated long-term covariance matrix corresponds in a corresponding long-term covariance matrix codebook. Generally, the capacity of the codebook corresponding to the first latest estimated long-term covariance matrix is high, therefore, the quantization information of a complete estimated long-term covariance matrix usually has a large number of bits. For instance, the complete estimated long-term covariance matrix in this embodiment may have 6-bits quantization information.

According to the method of another embodiment of the present invention, after step S201 and S202 has been performed for one time, UE 10 may cyclically perform the step S202 for multiple times with the long-term feedback duration T as period, wherein the number of cycles may be a pre-defined threshold, for instance 15 in this embodiment. That is to say, supposing the reset duration D to be a period of 300 subframes, while the long-term feedback duration T is assumed to be 20 subframes, then reset duration D equals to 15 T. After reset point t, feedback for the quantization of variation information is repeated on consecutive long-term feedback instant t+nT(n<15).

According to the method of another embodiment of the present invention, UE 10 cyclically performs, with the above reset duration D as period, the step performed in one reset duration D in the above embodiment. For instance, as shown in FIG. 2, UE 10 cyclically performs, according to the direction indicated by the arrow of the dash line, step S201→S202→S201→S202 .... Certainly, the cycle may be S201→S202→S202→S202→S201→S202→S202→S202→S201 ..., and the specific cyclical manner will not be enumerated any more.

Figure 4:
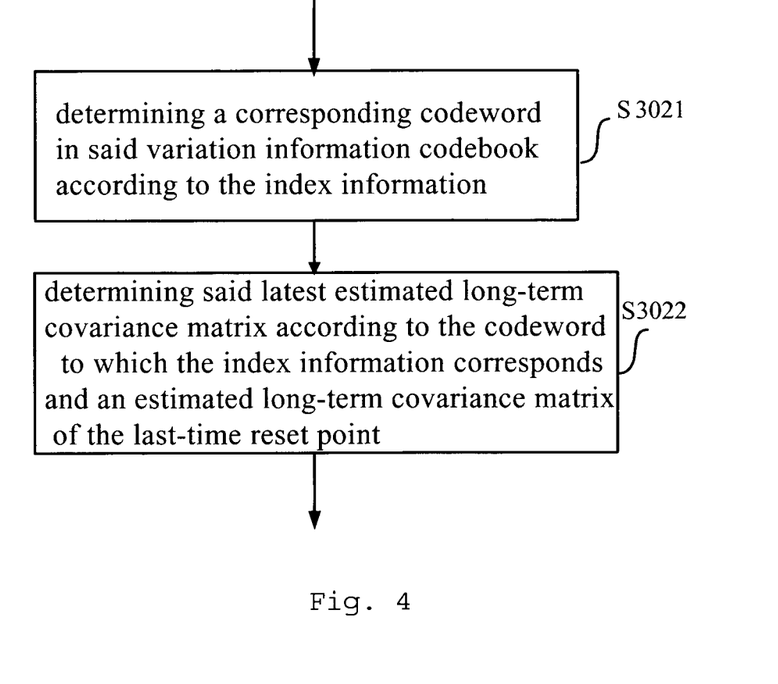
FIG. 4 illustrates the sub-flowchart of step S302 of a method of processing feedback information from a user equipment according to another embodiment of the present invention.

FIG. 4 illustrates the sub-flowchart of step S302 of a method of processing feedback information from a UE according to another embodiment of the present invention. As shown in the figure, when the feedback information contains the index information of the codeword to which the variation information corresponds in a variation information codebook, then step S302 in FIG. 3 comprises step S3021 and S3022.

In step S3021, base station 20 determines a corresponding codeword in the variation information codebook according to the index information.

Subsequently, in step S3022, base station 20 determines the latest estimated long-term covariance matrix according to the codeword to which the index information corresponds and an estimated long-term covariance matrix of the last-time reset point. Wherein, the variation information is used for reflecting the variation of the latest estimated long-term covariance matrix with respect to the estimated long-term covariance matrix of the last-time reset point.

Generally, there is also saved, in base station 20, a variation information codebook corresponding to that as shown in formula (5) for UE 10. After base station 20 receives the feedback information from UE 10, if the feedback information contains the index information of a codeword to which the variation information corresponds in a variation information codebook, for instance 001, then base station may determine a corresponding codeword from the variation information codebook according to the index information in the feedback information. For instance, in this embodiment, according to index information 001 in the feedback information, the corresponding codeword may be determined, from the variation information codebook as shown in formula (5), to be $$W_2 = \text{diag}\left\{1, e^{-j\frac{\pi}{64}}, e^{-j\frac{2\pi}{64}}, e^{-j\frac{3\pi}{64}}\right\}.$$

Subsequently, in step S3022, base station 20 determines the latest estimated long-term covariance matrix according to the codeword $$W_2 = \text{diag}\left\{1, e^{-j\frac{\pi}{64}}, e^{-j\frac{2\pi}{64}}, e^{-j\frac{3\pi}{64}}\right\}$$

and the estimated long-term covariance matrix of last-time reset point t. Wherein, the variation information may be used for reflecting the variation of the latest estimated long-term covariance matrix with respect to the estimated long-term covariance matrix of last-time reset point.

Preferably, in correspondence to UE 10 side, base station 20 may also determines the latest estimated long-term covariance matrix by formula (7), with no description made redundantly herein.

If the feedback information contains the index information of a codeword to which the latest estimated long-term covariance matrix corresponds in the long-term covariance matrix codebook, then step S302 in FIG. 3 comprises, base station 20 determines the latest estimated long-term covariance matrix out of the long-term covariance matrix codebook according to the index information. Normally, in correspondence to UE 10 side, there is also saved, in base station 20, a long-term covariance matrix codebook, and base station 20 may determine a corresponding codeword therefrom according to the received index information, thereby resulting in the latest estimated long-term covariance matrix, and herein, the method of determining the latest estimated long-term covariance matrix according to index information is similar to the method of determining a corresponding codeword out of the variation information codebook in step S3021, with no description made redundantly.

A system level experiment executed by means of the method according to the embodiment of present invention is as follows, and System performance evaluations are focused on FDD system, downlink ZF precoding is based on channel direction information (CDI) feedback from UE 10. And a 4×2 Tx/Rx antenna deployment is assumed. The Detailed experimental parameters are listed in table 1.

TABLE 1 parameters of system level experiment according to an embodiment of present invention

| Parameter | Assumption |
|---|---|
| Duplex method | FDD |
| Scenario | 3GPP case 1 with SCM-UMa |
| DL transmission scheme | MU-MIMO: ZF based precoding, max. 4 UEs, rank 1 per UE |
| PMI/CQI measurement and feedback | 5-subframe feedback period for PMI/CQI 20-subframe feedback period for covariance matrix R 6-subframe feedback delay |

TABLE 1-continued parameters of system level experiment
according to an embodiment of present invention

| Parameter | Assumption |
|---|---|
| Channel estimation error | Ideal |
| UE speed | 3 km/h |
| Scheduler | Greedy search algorithm based on PF |
| Link to system mapping | RBIR |
| Control overhead | Fixed 0.3063 |

Multi-user MIMO is 1-stream transmission with transformed Rel-8 codebook quantization. 3-bit variation information codebook set of index is composed of 8 codebooks with 4×4 diagonal matrix codeword as shown in formula (5).

The three kinds of MU-MIMO algorithm have been evaluated and compared with each other, as shown in table 2.

TABLE 2 system level experiment result according to
the embodiment of the present invention

| Transmit scheme | Cell average SE (bps/Hz/cell) | Cell-edge SE (bps/Hz) |
|---|---|---|
| MU-MIMO without covariance matrix feedback (MU-MIMO w/o R) | 3.19(1.00) | 0.097(1.00) |
| MU-MIMO with normal covariance matrix feedback (MU-MIMO w/normal R) | 3.77(1.18) | 0.106(1.09) |
| MU-MIMO with covariance matrix feedback of variation information (MU-MIMO w/differential R) | 3.76(1.18) | 0.103(1.06) |

Wherein, the first item in Table 2 with the name of "MU-MIMO w/o R" utilizes baseline Rel-8 codebook to quantize the channel information without the aid of the long-term covariance matrix.

The second item in Table 2 with the name of "MU-MIMO w/(normal) R", is a adaptive codebook feedback with the aid of long-term covariance matrix R, wherein the feedback duration T used by long-term covariance matrix has a length of 20 subframes with a 6-bit matrix quantization for every feedback instant.

The third item in Table 2 with the name of "MU-MIMO w/differential R" utilizes the variation information codebook to decrease feedback overhead of the long-term covariance matrix R. The much longer reset duration D employed by the long-term covariance matrix has a length of 300 subframes. The complete covariance matrix information is reported only at the starting point of reset duration D or reset point, and has 6-bit matrix quantization. In the later sequential long-term feedback instants (T=20 subframes), only 3-bit variation information is enough for the quantization of the latest long-term covariance matrix.

It could be derived from table 2 that the long-term covariance matrix feedback based on the variation information (third item) has almost no system performance loss over normal long-term covariance matrix feedback (second item), and both of long-term covariance matrix aided adaptive codebook feedback has 18% gains of cell average spectrum efficiency compared with traditional Rel-8 codebook based on MU-MIMO (first one). At the same time the feedback method (third item) proposed in the embodiment of the present invention has greatly reduced overhead of channel feedback of long-term covariance matrix by about 50% compared with normal covariance matrix feedback (second item). The experiment result reveals that the solution of the present invention greatly reduces the feedback overhead of the long-term covariance matrix while introducing no reduction to the existing system performance of MU-MIMO. The system experiment with the method/device of the embodiment(s) of the present invention reveals that the method/device according to the embodiment of the present invention, enhances feedback efficiency of the channel information, reduces feedback overhead of the long-term covariance matrix, and maintains a high performance of single-user /multi-user MIMO system.

Figure 5:
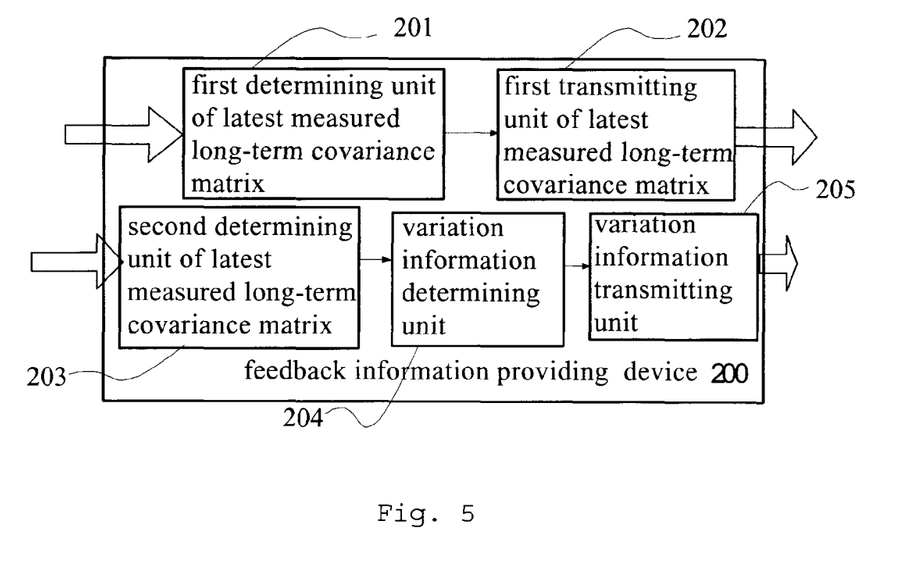
FIG. 5 illustrates the function block diagram of a device of providing feedback information to a base station according to another embodiment of the present invention.

FIG. 5 illustrates the function block diagram of a device for providing the base station with the feedback information according to another embodiment of the present invention. As shown in the Figure, feedback information providing device 200 comprises a first determining unit 201 of latest measured long-term covariance matrix, a first transmitting unit 202 of latest measured long-term covariance matrix, a second determining unit 203 of latest measured long-term covariance matrix, variation information determining unit 204, variation information transmitting unit 205.

Feedback information providing device 200 may usually be applied within UE 10, wherein the first determining unit 201 of latest measured long-term covariance matrix is configured to determine a first latest measured long-term covariance matrix according to a downlink channel matrix. The first transmitting unit 202 of latest measured long-term covariance matrix is configured to transmit the quantization of a first latest estimated long-term covariance matrix corresponding to the first latest measured long-term covariance matrix to the base station 20. The second determining unit 203 of latest measured long-term covariance matrix is configured to determine a second latest measured long-term covariance matrix according to a downlink channel matrix model. The variation information determining unit 204 is configured to determine the variation information of a second latest estimated long-term covariance matrix with respect to an estimated long-term covariance matrix of the last-time reset point; wherein, the second latest estimated long-term covariance matrix derived according to the variation information and the estimated long-term covariance matrix of the last-time reset point most approximates the second latest measured long-term covariance matrix. And the variation information transmitting unit 205 is configured to transmit the quantization of the variation information to the base station.

In another embodiment of the present invention, the quantization of the variation information transmitted by the variation information transmitting unit 205 may be the index information of a codeword to which the variation information corresponds in a variation information codebook, and the quantization of the first latest estimated long-term covariance matrix in the first transmitting unit 202 of latest measured long-term covariance matrix is the index of a codeword to which the first latest estimated long-term covariance matrix corresponds in a long-term covariance matrix codebook. For instance, quantization W of the variation information may take the form of the index information of the codeword to which the variation information W corresponds in the variation information codebook as shown in formula (5). In this embodiment, for instance, the codeword in the codebook as shown in formula (5) may be introduced into formula (6), (7) sequentially, and finally the codeword $W_2$ is selected as satisfying the criteria shown in formula (6), then, the index information of the codeword within such codebook may be determined to be 2. With the capacity of codebook taken into account, variation information with only 3 bits may represent the quantization of the long-term covariance matrix, namely 001 in binary mode.

Wherein, the variation information determining unit is configured to determine the variation information according to the following formula:

$$W = \arg\max \frac{|\text{trace}(\overline{R}(t+nT)\hat{R}(t+nT)^H)|}{\|\overline{R}(t+nT)\|_F \|\hat{R}(t+nT)\|_F},$$

$$\hat{R}(t+nT) = W\overline{R}(t)W^H$$

wherein, W denotes the codeword satisfying the above formula in the variation information codebook as shown in formula (5), which is $W_2$ in this embodiment. $W^H$ denotes the conjugate transpose matrix of the codeword W, instant t denotes the last-time reset point, T denotes the period of a long-term feedback, instant t+nT denotes occurrence point of the second latest measurement, W denotes the variation information of the second latest estimated long-term covariance matrix $\overline{R}(t+nT)$ in instant t+nT with respect to the first latest estimated long-term covariance matrix $\overline{R}(t)$ in instant t, $\|(\bullet)\|_F$ denotes operation of normalization.

Optionally, according to downlink channel matrix model H(t,f), the first determining unit 201 of latest measured long-term covariance matrix determines, by formula (1), the first latest measured long-term covariance matrix. Likewise, the second determining unit 203 of latest measured long-term covariance matrix may determine, by formula (1'), the second latest measured long-term covariance matrix, with no redundant description made herein.

Figure 6:
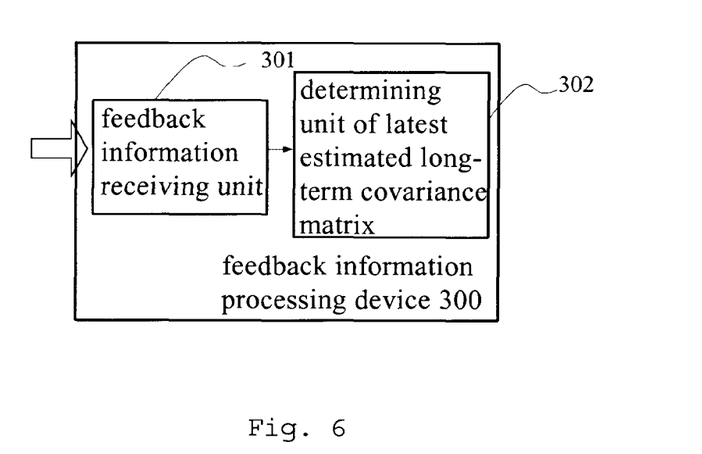
FIG. 6 illustrates the function block diagram of a device for processing feedback information from a user equipment according to another embodiment of the present invention.

FIG. 6 illustrates the function block diagram of a device for processing the feedback information from UE according to another embodiment of the present invention. As shown in the figure, the feedback information processing device 300 comprises feedback information receiving device 301, and determining unit 302 of latest estimated long-term covariance matrix.

Feedback information processing device 300 is generally applicable to base station 20, wherein the feedback information receiving device 301 is configured to receive the feedback information from UE 10, and determining unit 302 of latest estimated long-term covariance matrix is configured to determine the latest estimated long-term covariance matrix according to the feedback information.

In another embodiment of the present invention, when the feedback information includes the index information of a codeword to which variation information corresponds in a variation information codebook, for example 001 for the index information in this embodiment, then the determining unit 302 of latest estimated long-term covariance matrix is further configured to determine a corresponding codeword, W2 in this embodiment, in the variation information codebook as shown in formula (5) according to the index information 001. And the latest estimated long-term covariance matrix $\overline{R}(t+nT)$ may be determined according to the codeword to which the index information corresponds and an estimated long-term covariance matrix $\overline{R}(t)$ of the last-time reset point. To be specific, latest estimated long-term covariance matrix $\overline{R}(t+nT)$ may be determined by the formula $\overline{R}(t+nT) = W\overline{R}(t)W^H$.

Wherein, the variation information is used for reflecting the variation of the latest estimated long-term covariance matrix $\overline{R}(t+nT)$ with respect to the estimated long-term covariance matrix $\overline{R}(t)$ of the last-time reset point t. And when the feedback information comprises the index information of a codeword to which the latest estimated long-term covariance matrix corresponds in a long-term covariance matrix codebook, the determining unit of latest estimated long-term covariance matrix may be further configured to determine the latest estimated long-term covariance matrix from the estimated long-term covariance matrix codebook according to the index information. Generally, the capacity of codebook of the estimated long-term covariance matrix is high, therefore, the quantization information of a complete estimated long-term covariance matrix usually has a large number of bits. For instance, the complete estimated long-term covariance matrix in this embodiment may have 6-bits quantization information.

What is claimed is:

1. A method of providing feedback information to a base station in a user equipment of a communication system based on MIMO, the method comprising:
   determining a first latest measured long-term covariance matrix according to a downlink channel matrix model;
   transmitting a quantization of a first latest estimated long-term covariance matrix corresponding to the first latest measured long-term covariance matrix to the base station;
   determining a second latest measured long-term covariance matrix according to a downlink channel matrix model;
   determining variation information of a second latest estimated long-term covariance matrix with respect to an estimated long-term covariance matrix of a last-time reset point; wherein, the second latest estimated long-term covariance matrix is derived according to the variation information and the estimated long-term covariance matrix of the last-time reset point approximates the second latest measured long-term covariance matrix; and
   transmitting a quantization of the variation information to the base station.

2. The method according to claim 1, wherein the determining a second latest measured long-term covariance matrix is repeated for a plurality of times.

3. The method according to claim 2, wherein the number of repetitions of the determining a second latest measured long-term covariance matrix is a predetermined threshold.

4. The method according to claim 1, wherein determining a first latest measured long-term covariance matrix comprises:
   determining the first latest measured long-term covariance matrix $\overline{R}(t)$ according to the following formula, $$\overline{R}(t) = (1-\alpha)\overline{R}(t-1) + \alpha \frac{1}{|S|} \sum_{f \in S} H(t,f)^H H(t,f)$$

wherein, S denotes a set of subcarriers in the whole bands of the channel, |S| denotes cardinality of S, f denotes a subcarrier in the S, t denotes a subframe, H (t,f) denotes a downlink channel matrix based on the t and f, H $(t,f)^H$ denotes a conjugate transpose of the H (t,f), and $\alpha$ is an averaging factor.

5. The method according to claim 1, wherein, the quantization of the variation information in determining a second latest measured long-term covariance matrix is index information of a codeword to which the variation information corresponds in a variation information codebook, and the quantization of the first latest estimated long-term covariance matrix in determining a first latest measured long-term covariance matrix is the index of a codeword to which the first latest estimated long-term covariance matrix corresponds in a long-term covariance matrix codebook.

6. The method according to claim 1, wherein the determining a second latest measured long-term covariance matrix comprises:
    determining the variation information according to the following formula, $$W = \arg\max \frac{|\text{trace}(\overline{R}(t+nT)\hat{R}(t+nT)^H)|}{\|\overline{R}(t+nT)\|_F \|\hat{R}(t+nT)\|_F},$$

$$\overline{R}(t+nT) = W\overline{R}(t)W^H$$

wherein, W denotes a codeword satisfying the above formula in the variation information codebook, $W^H$ denotes a conjugate transpose matrix of the codeword W, the t denotes the last-time reset point, T denotes a period of a long-term feedback, the t+nT denotes occurrence point of the second latest measurement, W denotes variation information of the estimated long-term covariance matrix $\overline{R}(t+nT)$ in the t+nT with respect to the estimated long-term covariance matrix $\overline{R}(t)$ in the t, $\|(\bullet)\|_F$ denotes operation of normalization.

7. A method of providing feedback information to a base station in a user equipment of a communication system based on MIMO, the method comprising:
    repeating method of claim 1.

8. A method of processing feedback information from a user equipment in a base station of a communication system based on MIMO, the method comprising:
    receiving the feedback information from the user equipment; and
    determining a latest estimated long-term covariance matrix according to the feedback information, wherein when the feedback information comprises index information of a codeword to which variation information corresponds in a variation information codebook, determining a latest estimated long-term covariance matrix comprises at least:
        determining a corresponding codeword in a variation information codebook according to index information, and
        determining the latest estimated long-term covariance matrix according to the codeword to which the index information corresponds and an estimated long-term covariance matrix of the last-time reset point, wherein the variation information is used for reflecting the variation of the latest estimated long-term covariance matrix with respect to the estimated long-term covariance matrix of the last-time reset point.

9. The method according to claim 8, wherein, when the feedback information comprises the index information of a codeword to which the latest estimated long-term covariance matrix corresponds in a long-term covariance matrix codebook, determining a latest estimated long-term covariance matrix comprises:
    determining the latest estimated long-term covariance matrix from the long-term covariance matrix codebook according to the index information.

10. The method according to claim 8, wherein, the step of determining the latest estimated long-term covariance matrix in determining a latest estimated long-term covariance matrix further comprises:
    determining the latest estimated long-term covariance matrix according to the following formula, $$\overline{R}(t+nT) = W\overline{R}(t)W^H$$

wherein t denotes the last-time reset point, n denotes a positive integer, T denotes a period of a long-term feedback, $\overline{R}(t)$ denotes the latest estimated long-term covariance matrix, $\overline{R}(t)$ denotes the estimated long-term covariance matrix of the last-time reset point, W denotes a codeword to which the variation information corresponds in a variation information codebook, and $W^H$ denotes a conjugate transpose matrix of the codeword W.

11. A device for providing feedback information to a base station in a user equipment of a communication system based on MIMO, the device comprising:
    a first determining unit, configured to determine a first latest measured long-term covariance matrix according to a downlink channel matrix;
    a first transmitting unit, configured to transmit a quantization of a first latest estimated long-term covariance matrix corresponding to the first latest measured long-term covariance matrix to the base station;
    a second determining unit, configured to determine a second latest measured long-term covariance matrix according to a downlink channel matrix model;
    a variation information determining unit, configured to determine variation information of a second latest estimated long-term covariance matrix with respect to an estimated long-term covariance matrix of a last-time reset point; wherein, the second latest estimated long-term covariance matrix derived according to the variation information and the estimated long-term covariance matrix of the last-time reset point approximates the second latest measured long-term covariance matrix; and
    a variation information transmitting unit, configured to transmit the quantization of the variation information to the base station.

12. The device according to claim 11, wherein, the quantization of the variation information in the variation information transmitting unit is index information of a codeword to which the variation information corresponds in a variation information codebook, and the quantization of the first latest estimated long-term covariance matrix in the first transmitting unit of latest measured long-term covariance matrix is the index of a codeword to which the first latest estimated long-term covariance matrix in a long-term covariance matrix codebook, and the variation information determining unit is configured to determine the variation information according to the following formula, $$W = \arg\max \frac{|\text{trace}(\overline{R}(t+nT)\hat{R}(t+nT)^H)|}{\|\overline{R}(t+nT)\|_F \|\hat{R}(t+nT)\|_F},$$

$$\overline{R}(t+nT) = W\overline{R}(t)W^H$$

wherein, W denotes the codeword satisfying the above formula in the variation information codebook, $W^H$ denotes a conjugate transpose matrix of the codeword W, t denotes the last-time reset point, T denotes the period of a long-term feedback, t+nT denotes occurrence point of the second latest measurement, W denotes the variation information of the estimated long-term covariance matrix $\overline{R}(t+nT)$ in t+nT with respect to the estimated long-term covariance matrix $\overline{R}(t)$ in t, and $\|(\bullet)\|_F$ denotes operation of normalization.

13. A device for processing feedback information from a user equipment in a base station of a communication system based on MIMO, the device comprising:
  a feedback information receiving unit, configured to receive the feedback information from the user equipment;
  a determining unit of latest estimated long-term covariance matrix, configured to determine a latest estimated long-term covariance matrix according to the feedback information, wherein when the feedback information comprises index information of a codeword to which variation information corresponds in a variation information codebook, determining a latest estimated long-term covariance matrix comprises at least:
    determining a corresponding codeword in a variation information codebook according to the index information, and
    determining the latest estimated long-term covariance matrix according to the codeword to which the index information corresponds and an estimated long-term covariance matrix of the last-time reset point, wherein the variation information is used for reflecting the variation of the latest estimated long-term covariance matrix with respect to the estimated long-term covariance matrix of the last-time reset point.

14. The device according to claim 13,
  wherein, when the feedback information comprises the index information of a codeword to which the latest estimated long-term covariance matrix corresponds in a long-term covariance matrix codebook, the determining unit of latest estimated long-term covariance matrix is further configured to determine the latest estimated long-term covariance matrix from the long-term covariance matrix codebook according to the index information.

* * * * *